United States Patent
Sadakiyo et al.

(10) Patent No.: US 11,180,136 B2
(45) Date of Patent: Nov. 23, 2021

(54) AUTONOMOUS PARKING APPARATUS

(71) Applicant: Honda Motor Co., Ltd., Tokyo (JP)

(72) Inventors: Masayuki Sadakiyo, Wako (JP);
Hisashi Ishikawa, Wako (JP);
Tomoyuki Noguchi, Wako (JP);
Takashi Adachi, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 267 days.

(21) Appl. No.: 16/359,277

(22) Filed: Mar. 20, 2019

(65) Prior Publication Data
US 2019/0299979 A1 Oct. 3, 2019

(30) Foreign Application Priority Data
Mar. 28, 2018 (JP) .............................. JP2018-062761

(51) Int. Cl.
*B60W 30/06* (2006.01)
*B60W 10/06* (2006.01)
*B60W 30/18* (2012.01)

(52) U.S. Cl.
CPC ............ *B60W 30/06* (2013.01); *B60W 10/06* (2013.01); *B60W 30/18063* (2013.01)

(58) Field of Classification Search
CPC .............................. B60W 30/06; B60W 10/06
See application file for complete search history.

(56) References Cited

U.S. PATENT DOCUMENTS

| 2003/0171186 A1* | 9/2003 | Okada ................... B60K 31/04 477/71 |
| 2019/0031188 A1* | 1/2019 | Yamashita ............ B60W 30/06 |

FOREIGN PATENT DOCUMENTS

JP 2010230139 A 10/2010

* cited by examiner

*Primary Examiner* — Jess Whittington
(74) *Attorney, Agent, or Firm* — Duft & Bornsen, PC

(57) ABSTRACT

An autonomous parking apparatus incorporated into a vehicle including an internal combustion engine, a torque converter, a transmission, a detector detecting a creep torque acting on an axle, and a microprocessor. The microprocessor is configured to perform instructing a self-parking of the vehicle, determining whether it is necessary to perform a creep torque reduction control based on a creep torque detected when the self-parking is instructed, and controlling the transmission in accordance with a determination result in the determining. When it is determined that it is necessary to perform the creep torque reduction control, the microprocessor is configured to control the transmission so as to increase engaging force of engagement elements of the transmission or change speed stage of the transmission to high speed side than when it is determined that it is unnecessary to perform the creep torque reduction control.

13 Claims, 6 Drawing Sheets

FIG. 3

|  | C1 | C2 | C3 | B1 | B2 | B3 | TWC |
|---|---|---|---|---|---|---|---|
| RVS |  |  | ○ |  | ○ |  | ○ |
| LOW |  |  |  | ○ | ○ |  | ○ |
| 2nd |  | ○ |  | ○ | ○ |  |  |
| 3rd |  |  | ○ | ○ | ○ |  |  |
| 4th |  | ○ | ○ | ○ |  |  |  |
| 5th | ○ |  | ○ | ○ |  |  |  |
| 6th | ○ | ○ | ○ |  |  |  |  |
| 7th | ○ |  | ○ |  | ○ |  |  |
| 8th | ○ | ○ |  |  | ○ |  |  |
| 9th | ○ |  |  |  | ○ | ○ |  |
| 10th | ○ | ○ |  |  |  | ○ |  |

AUTONOMOUS PARKING APPARATUS

CROSS-REFERENCE TO RELATED APPLICATION

This application is based upon and claims the benefit of priority from Japanese Patent Application No. 2018-062761 filed on Mar. 28, 2018, the content of which is incorporated herein by reference.

BACKGROUND OF THE INVENTION

Field of the Invention

This invention relates to an autonomous parking apparatus configured to automatically park a vehicle in a target parking space.

Description of the Related Art

Conventionally, as an apparatus of this type, there is a known parking assistant apparatus that is applied to an automated manual transmission vehicle. Such an apparatus is described in Japanese Unexamined Patent Publication No. 2010-230139 (JP2010-230139A), for example. The apparatus described in JP2010-230139A is configured to decrease engaging force between friction engagement elements when the parking assistant apparatus is active than when it is non-active, in order to decrease running speed by creeping in a state where the parking assistant apparatus is active.

In a vehicle having a torque converter, unlike the automated manual transmission vehicle described in JP2010-230139A, creep torque variance with temperature environment is great. Therefore, controllability in self-parking of the vehicle using creep torque is apt to get worse.

SUMMARY OF THE INVENTION

An aspect of the present invention is an autonomous parking apparatus incorporated into a vehicle, including: an internal combustion engine; a torque converter to which a torque output from the internal combustion engine is input; an axle; a transmission provided in a torque transmission path between the torque converter and the axle and including an input shaft connected to the torque converter and an output shaft connected to the axle; a detector configured to detect a creep torque acting on the axle or a physical quantity having a correlation with the creep torque; and an electronic control unit having a microprocessor and a memory. The transmission includes an engaging mechanism having a pair of engagement elements engaging or disengaging with each other, and is configured to transmit a torque input from the input shaft through the engaging mechanism to the output shaft. The microprocessor is configured to perform: instructing a self-parking of the vehicle; determining whether it is necessary to perform a creep torque reduction control based on the creep torque or the physical quantity detected by the detector when the self-parking is instructed; and controlling the transmission in accordance with a determination result in the determining. The creep torque reduction control includes a first creep torque reduction control of controlling an engaging force of the pair of engagement elements to a second engaging force smaller than a first engaging force and a second torque reduction control of controlling a speed stage of the transmission to a second speed stage with a transmission speed ratio smaller than a transmission speed ratio of a first speed stage. Further, the microprocessor is configured to perform the controlling including controlling the engaging force of the pair of engagement elements to the first engaging force so as to integrally rotate the pair of engagement elements and controlling the speed stage of the transmission to the first speed stage when it is determined in the determining that it is not necessary to perform the creep torque reduction control, and performing at least one of the first torque reduction control and the second torque reduction control when it is determined in the determining that it is necessary to perform the creep torque reduction control.

BRIEF DESCRIPTION OF THE DRAWINGS

The objects, features, and advantages of the present invention will become clearer from the following description of embodiments in relation to the attached drawings, in which:

FIG. 3 is a diagram in table format showing engaged state of clutch mechanisms, brake mechanisms and a two-way clutch corresponding to speed stages of the transmission of FIG. 2;

DETAILED DESCRIPTION OF THE INVENTION

Figure 1:
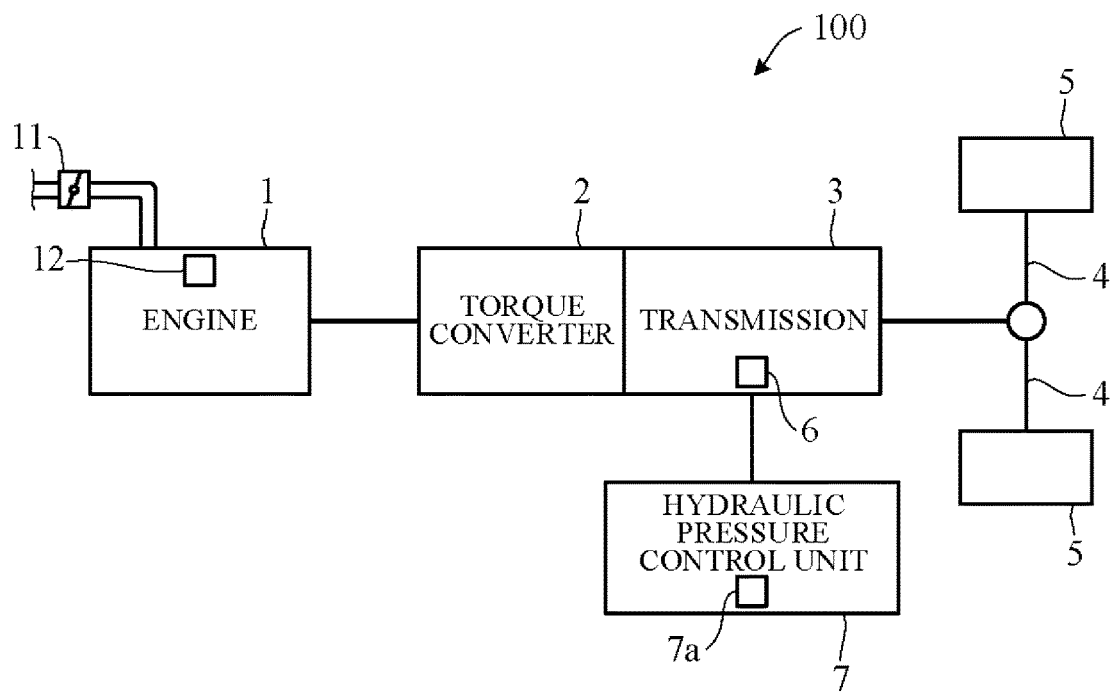
FIG. 1 is a diagram showing a configuration overview of a driving system of a self-driving vehicle incorporating an autonomous parking apparatus according to an embodiment of the invention.

Hereinafter, an embodiment of the present invention is explained with reference to FIGS. 1 to 9. A vehicle travel control apparatus according to an embodiment of the present invention is applied to a vehicle (self-driving vehicle) having a self-driving capability. Therefore, first a configuration of the self-driving vehicle is explained. FIG. 1 is a diagram showing a configuration overview of a driving system of a self-driving vehicle 100 incorporating an autonomous parking apparatus according to the present embodiment. The vehicle (self-driving vehicle) 100 is not limited to driving in a self-drive mode requiring no driver driving operations but is also capable of driving in a manual drive mode by driver operations.

As shown in FIG. 1, the vehicle 100 includes an engine 1, a torque converter 2 and a transmission 3.

Figure 4:
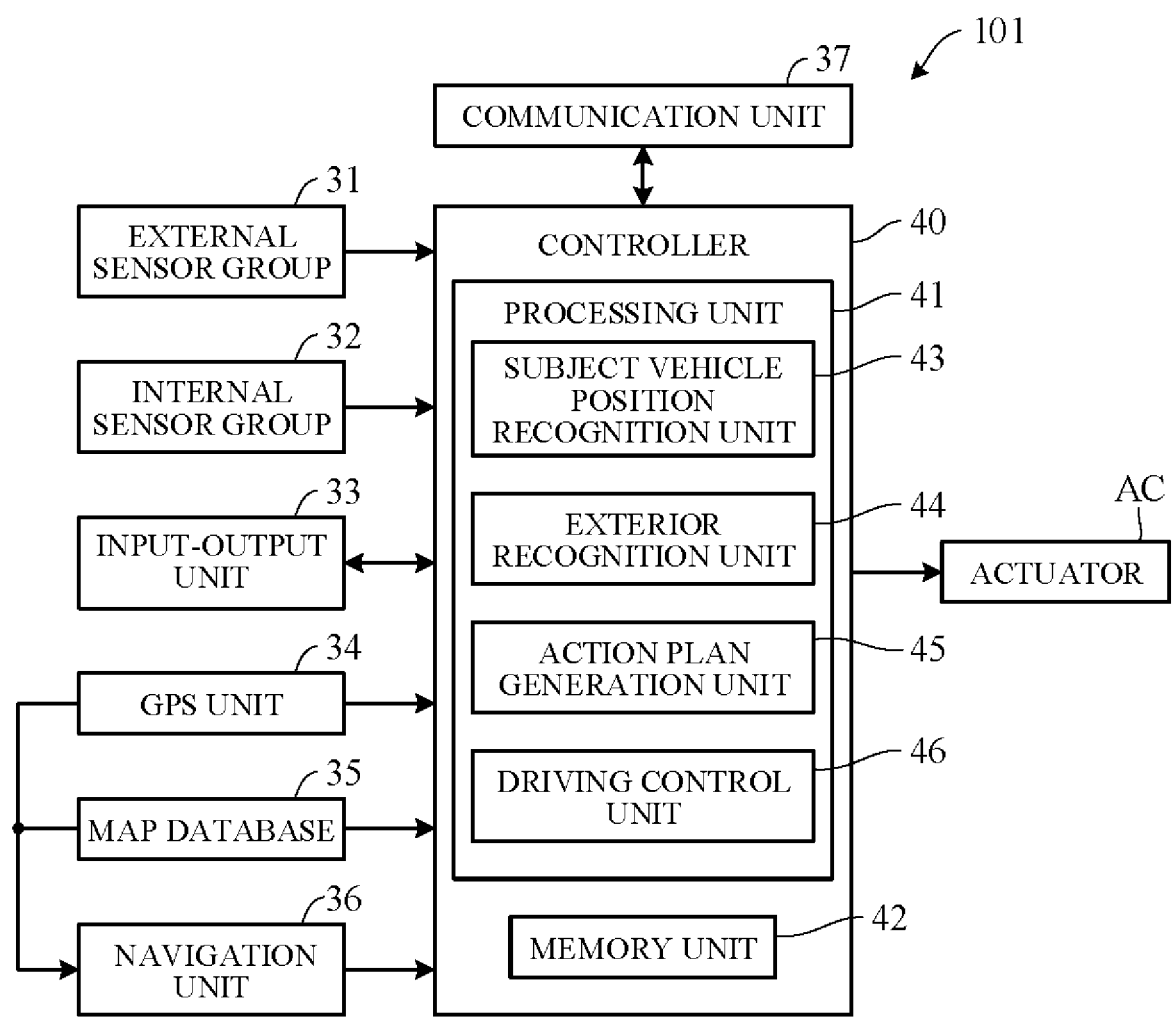
FIG. 4 is a block diagram schematically illustrating overall configuration of a vehicle control system controlling the self-driving vehicle of FIG. 1.

The engine 1 is an internal combustion engine (e.g., gasoline engine) wherein intake air supplied through a throttle valve and fuel injected from an injector are mixed at an appropriate ratio and thereafter ignited by a sparkplug or the like to burn explosively and thereby generate rotational power. A diesel engine or any of various other types of engine can be used instead of a gasoline engine. Air intake volume is metered by the throttle valve. An opening angle of the throttle valve 11 (throttle opening angle) is changed by a throttle actuator operated by an electric signal. The opening angle of the throttle valve 11 and an amount of fuel injected from the injector 12 (injection timing and injection time) are controlled by a controller 40 (FIG. 4).

Torque output from the engine 1 is input to the torque converter 2. The torque converter 2 has torque amplifying function, and torque output from the torque converter 2 is the transmission 3. The transmission 3, which is installed in a power transmission path between the torque converter 2 and drive wheels 4, varies speed of rotation input from the torque converter 2, and converts and outputs torque input from the torque converter 2. Torque output from the transmission 3 is transmitted to the drive wheels 5 through axles 4, thereby propelling the vehicle 100. Optionally, the vehicle 100 can be configured as a hybrid vehicle by providing a drive motor as a drive power source in addition to the engine 1.

The transmission 3 is, for example, a stepped transmission enabling stepwise speed ratio (gear ratio) shifting in accordance with multiple speed stages. Optionally, a continuously variable transmission enabling stepless speed ratio shifting can be used as the transmission 3. The transmission 3 can, for example, incorporate friction clutch or other engaging mechanism 6. The hydraulic pressure control unit 7 includes a control valve 7a (solenoid valve or proportional solenoid valve, etc.), and controls an oil flow to the engaging mechanism 6, whereby the speed stage of the transmission 3 can be changed.

Figure 2:
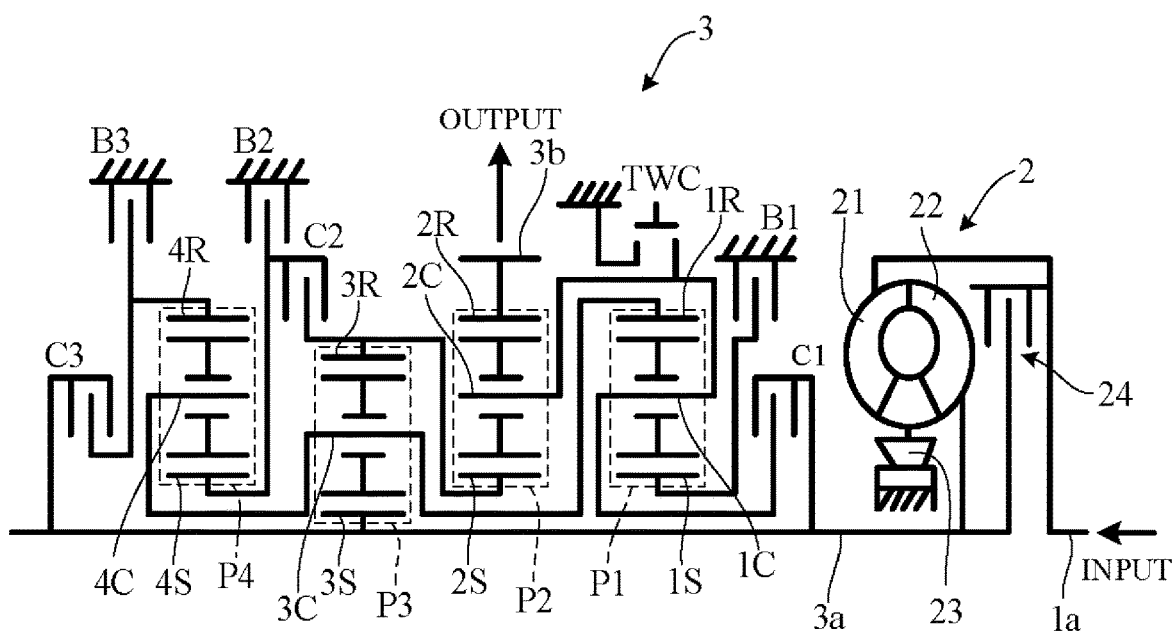
FIG. 2 is a skeleton diagram showing an example of a transmission of FIG. 1.

FIG. 2 is a skeleton diagram showing a specific example of the transmission 3. The transmission 3 of FIG. 2 is a stepped transmission with ten forward speeds and one reverse speed having multiple dry or wet clutch mechanisms C1 to C3 and brake mechanisms B1 to B3 as the engaging mechanism 6. Structural particulars of the torque converter 2 are also shown in FIG. 2.

As shown in FIG. 2, the torque converter 2 includes a pump impeller 21 connected to an output shaft (crankshaft) 1a of the engine 1, a turbine runner 22 connected to an input shaft 3a of transmission 3, a stator 23 installed between the pump impeller 21 and turbine runner 22, and a lockup clutch 24 that when in engaged state directly connects the output shaft 1a of the engine 1 and the input shaft 3a of the transmission 3.

When the lockup clutch 24 is in disengaged state, rotation of the output shaft 1a of the engine 1 rotates the pump impeller 21, whereby hydraulic oil discharged from the pump impeller 21 flows into the turbine runner 22, drives the turbine runner 22, and thereafter returns to the pump impeller 21 through the stator 23. As a result, rotation of the output shaft 1a reduced in speed and increased in torque is input to the input shaft 3a of the transmission 3. When the lockup clutch 24 is in engaged state, torque of the engine 1 is input through the lockup clutch 24 to the transmission 3.

The transmission 3 is an automatic transmission whose speed ratio stage is automatically shifted in accordance with vehicle speed and required driving force. Rotation of the input shaft 3a is shifted by the transmission 3 and output through an output shaft 3b. The transmission 3 includes first to fourth planetary gear mechanisms P1 to P4, the first to third clutch mechanisms C1 to C3, the first to third brake mechanisms B1 to B3, and a two-way clutch TWC. The first to fourth planetary gear mechanisms P1 to P4 are all of single pinion type respectively having sun gears 1S to 4S, ring gears 1R to 4R, and carriers 1C to 4C.

The carrier 1C of the first planetary gear mechanism P1 engages the carrier 2C of the second planetary gear mechanism P2, and the two of them rotate integrally. The sun gear 2S of the second planetary gear mechanism P2 engages the ring gear 3R of the third planetary gear mechanism P3, and the two of them rotate integrally. The ring gear 1R of the first planetary gear mechanism P1 engages the carrier 3C of the third planetary gear mechanism P3 and also engages the carrier 4C of the fourth planetary gear mechanism P4, and the three of them rotate integrally. The output shaft 3b is formed unitarily with the ring gear 2R of the second planetary gear mechanism P2. The input shaft 3a is connected to the sun gear 3S of the third planetary gear mechanism P3, and the two of them rotate integrally.

The first clutch mechanism C1 enables engagement and disengagement between the input shaft 3a and the carrier 1C of the first planetary gear mechanism P1. When the first clutch mechanism C1 engages, the input shaft 3a and carrier 1C rotate integrally. When the first clutch mechanism C1 disengages, the carrier 1C is rotatable relative to the input shaft 3a.

The second clutch mechanism C2 enables engagement and disengagement between the ring gear 3R of the third planetary gear mechanism P3 and the sun gear 4S of the fourth planetary gear mechanism P4. When the second clutch mechanism C2 engages, the ring gear 3R and sun gear 4S rotate integrally. When the second clutch mechanism C2 disengages, the sun gear 4S is rotatable relative to the ring gear 3R.

The third clutch mechanism C3 enables engagement and disengagement between the input shaft 3a and the ring gear 4R of the fourth planetary gear mechanism P4. When the third clutch mechanism C3 engages, the input shaft 3a and ring gear 4R rotate integrally. When the third clutch mechanism C3 disengages, the ring gear 4R is rotatable relative to the input shaft 3a.

The first brake mechanism B1 enables engagement and disengagement of the sun gear 1S of first planetary gear mechanism P1 with and from a transmission case. When the first brake mechanism B1 is engaged, the sun gear 1S is non-rotatable. When the first brake mechanism B1 is disengaged, the sun gear 1S is rotatable.

The second brake mechanism B2 is connected to the second clutch mechanism C2. It enables engagement and disengagement of the sun gear 4S of fourth planetary gear mechanism P4 with and from the transmission case. When the second brake mechanism B2 is engaged, the sun gear 4S is non-rotatable. When the second brake mechanism B2 is disengaged, the sun gear 4S is rotatable.

The third brake mechanism B3 is connected to the third clutch mechanism C3. It enables engagement and disengagement of the ring gear 4R of fourth planetary gear mechanism P4 with and from the transmission case. When the third brake mechanism B3 is engaged, the ring gear 4R is non-rotatable. When the third brake mechanism B3 is disengaged, the ring gear 4R is rotatable.

The first to third clutch mechanisms C1 to C3 and first to third brake mechanisms B1 to B3 respectively constitute the engaging mechanism 6 of FIG. 1. Their engage actions are controlled by the hydraulic pressure control unit 7. More specifically, each of the clutch mechanisms C1 to C3 and brake mechanisms B1 to B3 has a relatively rotatable pair of frictional engagement element sets. The paired sets of frictional engagement elements of each mechanism are connected to a hydraulically driven piston that presses the elements of the sets into abutting engagement. Hydraulic force acting on the pistons is adjusted by action of the control valve 7a of the hydraulic pressure control unit 7, whereby engaging force of the frictional engagement element sets of the individual engaging mechanisms C1 to C3 and B1 to B3 can be adjusted. Since the sets of frictional engagement elements can be made to slip during rotation by adjusting their engaging force, the individual clutch mechanisms C1 to C3 and brake mechanisms B1 to B3 can be put in partially clutched condition (half-clutch state).

The two-way clutch TWC is switchable between a locked state and an unlocked state. When the two-way clutch TWC is switched to locked state, rotation of the carrier 1C of the first planetary gear mechanism P1 and of the carrier 2C of the second planetary gear mechanism P2 is prevented. When the two-way clutch TWC is switched to unlocked state, the carriers 1C and 2C can rotate in one direction. The two-way clutch TWC can be switched between locked and unlocked state using an electromagnetic actuator, for example.

Actions of the clutch mechanisms C1 to C3, brake mechanisms B1 to B3 and two-way clutch TWC are controlled by instructions from the controller (FIG. 4). The controller uses vehicle speed and required driving force to determine target speed stage from a predetermined shift chart. Then it accordingly outputs a control signal to the control valve 7a of the hydraulic pressure control unit 7 so as to shift speed stage of the transmission 3 to the target speed stage, switches engagement and disengagement of the clutch mechanisms C1 to C3 and brake mechanisms B1 to B3, and outputs a control signal to the electromagnetic actuator to switch locked and unlocked state of the two-way clutch TWC.

FIG. 3 is a diagram in table format showing engaged state of the clutch mechanisms C1 to C3, brake mechanisms B1 to B3 and two-way clutch TWC corresponding to speed stages of the transmission 3. Symbol "○" in the table indicates engaged state or locked state and absence of a symbol (blank) indicates disengaged or unlocked state. As indicated in FIG. 3, in first speed stage (LOW), for example, only the first brake mechanism B1 and second brake mechanism B2 are engaged, and the two-way clutch TWC is locked. In second speed stage (2nd), only the second clutch mechanism C2, first brake mechanism B1 and second brake mechanism B2 are engaged, and the two-way clutch TWC is unlocked. In reverse (RVS), only the third clutch mechanism C3 and second brake mechanism B2 are engaged, and the two-way clutch TWC is locked.

Next, a configuration of a vehicle control system controlling the self-driving vehicle 100 of FIG. 1 is explained. FIG. 4 is a block diagram schematically illustrating overall configuration of a vehicle control system 101 controlling the self-driving vehicle 100. As shown in FIG. 4, the vehicle control system 101 includes mainly the controller 40, and as members communicably connected with the controller 40 through CAN (Controller Area Network) communication or the like, an external sensor group 31, an internal sensor group 32, an input-output unit 33, a GPS unit 34, a map database 35, a navigation unit 36, a communication unit 37, and actuators AC.

The term external sensor group 31 herein is a collective designation encompassing multiple sensors (external sensors) for detecting external circumstances constituting vehicle ambience data. For example, the external sensor group 31 includes, inter alia, a LIDAR (Light Detection and Ranging) for measuring distance from the vehicle 100 to ambient obstacles by measuring scattered light produced by laser light radiated from the vehicle 100 in every direction, a RADAR (Radio Detection and Ranging) for detecting other vehicles and obstacles around the vehicle 100 by radiating electromagnetic waves and detecting reflected waves, and cameras having a CCD, CMOS or other image sensor and attached to the vehicle 100 for imaging ambience (forward, reward and sideways) of the vehicle 100.

The term internal sensor group 32 herein is a collective designation encompassing multiple sensors (internal sensors) for detecting driving state of the vehicle 100. For example, the internal sensor group 32 includes, inter alia, a vehicle speed sensor for detecting vehicle speed of the vehicle 100 and acceleration sensors for detecting forward-rearward direction acceleration and lateral acceleration of the vehicle 100, respectively, an engine speed sensor for detecting rotational speed of the engine 1 (engine speed), a yaw rate sensor for detecting rotation angle speed around a vertical axis through center of gravity of the vehicle 100, and a throttle opening sensor for detecting opening angle of the throttle valve 11 (throttle opening angle). The internal sensor group 32 also includes sensors for detecting driver driving operations in manual drive mode, including, for example, accelerator pedal operations, brake pedal operations, steering wheel operations and the like.

The term input-output unit 33 is used herein as a collective designation encompassing apparatuses receiving instructions input by the driver and outputting information to the driver. The input-output unit 33 includes, inter alia, switches which the driver uses to input various instructions, a microphone which the driver uses to input voice instructions, a display for presenting information to the driver via displayed images, and a speaker for presenting information to the driver by voice. In the switch of the input-output unit 33, a self/manual drive select switch for instructing a self-drive mode or manual drive mode is also included.

The self/manual drive select switch, for example, is configured as a switch manually operable by the driver to output an instruction of switching to a self-drive mode enabling self-drive functions or a manual drive mode disabling self-drive functions in accordance with operation of the switch. Optionally, the self/manual drive select switch can be configured to instruct switching from manual drive mode to self-drive mode or from self-drive mode to manual drive mode when a predetermined condition is satisfied without operating the self/manual drive select switch. In other words, drive mode can be switched automatically not manually in response to automatic switching of the self/manual drive select switch.

The GPS unit 34 includes a GPS receiver for receiving position determination signals from multiple GPS satellites, and measures absolute position (latitude, longitude and the like) of the vehicle 100 based on the signals received from the GPS receiver.

The map database 35 is a unit storing general map data used by the navigation unit 36 and is, for example, implemented using a hard disk. The map data include road position data and road shape (curvature etc.) data, along with intersection and road branch position data. The map data stored in the map database 35 are different from high-accuracy map data stored in a memory unit 42 of the controller 40.

The navigation unit 36 retrieves target road routes to destinations input by the driver and performs guidance along selected target routes. Destination input and target route guidance is performed through the input-output unit 33. Target routes are computed based on current position of the vehicle 100 measured by the GPS unit 34 and map data stored in the map database 35.

The communication unit 37 communicates through networks including the Internet and other wireless communication networks to access servers (not shown in the drawings) to acquire map data, traffic data and the like, periodically or at arbitrary times. Acquired map data are output to the map database 35 and/or memory unit 42 to update their stored map data. Acquired traffic data include congestion data and traffic light data including, for instance, time to change from red light to green light.

The actuators AC are actuators for traveling of the vehicle 100. The actuators AC include a throttle actuator for adjusting opening angle of the throttle valve of the engine 1 (throttle opening angle), a shift actuator for changing speed stage of the transmission 3 by controlling oil flow to the engaging mechanism 6 of the transmission 3, a brake actuator for operating a braking device, and a steering actuator for driving a steering unit. The shift actuator includes the control valve 7a of the hydraulic pressure control unit 7 driven in accordance with electric signal (FIG. 1).

The controller 40 is constituted by an electronic control unit (ECU). In FIG. 2, the controller 40 is integrally configured by consolidating multiple function-differentiated ECUs such as an engine control ECU, a transmission control ECU, a clutch control ECU and so on. Optionally, these ECUs can be individually provided. The controller 40 incorporates a computer including a CPU or other processing unit (a microprocessor) 41, the memory unit (a memory) 42 of RAM, ROM, hard disk and the like, and other peripheral circuits such as I/O interface not shown in the drawings.

The memory unit 42 stores high-accuracy detailed map data including, inter alia, lane center position data and lane boundary line data. More specifically, road data, traffic regulation data, address data, facility data, telephone number data, parking lot data and the like are stored as map data. The road data include data identifying roads by type such as expressway, toll road and national highway, and data on, inter alia, number of road lanes, individual lane width, road gradient, road 3D coordinate position, lane curvature, lane merge and branch point positions, and road signs. The traffic regulation data include, inter alia, data on lanes subject to traffic restriction or closure owing to construction work and the like. The memory unit 42 also stores a shift map (shift chart) serving as a shift operation reference, various programs for performing processing, and threshold values used in the programs, etc.

As functional configurations, the processing unit 41 includes a subject vehicle position recognition unit 43, an exterior recognition unit 44, an action plan generation unit 45, and a driving control unit 46.

The subject vehicle position recognition unit 43 recognizes map position of the vehicle (subject vehicle) 100 (subject vehicle position), based on position data of the vehicle 100 calculated by the GPS unit 34 and map data stored in the map database 35. Optionally, the subject vehicle position can be recognized using map data (building shape data and the like) stored in the memory unit 42 and ambience data of the vehicle 100 detected by the external sensor group 31, whereby the subject vehicle position can be recognized with high accuracy. Optionally, when the subject vehicle position can be measured by sensors installed externally on the road or by the roadside, the subject vehicle position can be recognized with high accuracy by communicating with such sensors through the communication unit 37.

The exterior recognition unit 44 recognizes external circumstances around the vehicle 100 based on signals from LIDARs, RADARs, cameras and the like of the external sensor group 31. For example, it recognizes position, speed and acceleration of nearby vehicles (forward vehicle or rearward vehicle) driving in the vicinity of the vehicle 100, position of vehicles stopped or parked in the vicinity of the vehicle 100, and position and state of other objects. Other objects include traffic signs, traffic lights, road boundary and stop lines, buildings, guardrails, power poles, commercial signs, pedestrians, bicycles, and the like. Recognized states of other objects include, for example, traffic light color (red, green or yellow) and moving speed and direction of pedestrians and bicycles.

The action plan generation unit 45 generates a driving path of the vehicle 100 (target path) from present time point to a certain time ahead based on, for example, a target route computed by the navigation unit 36, subject vehicle position recognized by the subject vehicle position recognition unit 43, and external circumstances recognized by the exterior recognition unit 44. When multiple paths are available on the target route as target path candidates, the action plan generation unit 45 selects from among them the path that optimally satisfies legal compliance, safe efficient driving and other criteria, and defines the selected path as the target path. The action plan generation unit 45 then generates an action plan matched to the generated target path. An action plan is also called "travel plan".

The action plan includes action plan data set for every unit time Δt (e.g., 0.1 sec) between present time point and a predetermined time period T (e.g., 5 sec) ahead, i.e., includes action plan data set in association with every unit time Δt interval. The action plan data include subject vehicle position data and vehicle state data for every unit time Δt. The position data are, for example, target point data indicating 2D coordinate position on road, and the vehicle state data are vehicle speed data indicating vehicle speed, direction data indicating direction of the vehicle 100, and the like. Action plan is updated every unit time Δt.

The action plan generation unit 45 generates the target path by connecting position data at every unit time Δt between present time point and predetermined time period T1 ahead in time order. Further, the action plan generation unit 45 calculates acceleration (target acceleration) of sequential unit times Δt, based on vehicle speed (target vehicle speed) corresponding to target point data of sequential unit times Δt on target path. In other words, the action plan generation unit 45 calculates target vehicle speed and target acceleration. Optionally, the driving control unit 46 can calculate target acceleration. Required driving force is driving force for obtaining target acceleration.

In self-drive mode, the driving control unit 46 controls the actuators AC to drive the vehicle 100 along target path generated by the action plan generation unit 45 at target vehicle speed and target acceleration. More specifically, the driving control unit 46 controls the throttle actuator, shift actuator, brake actuator and steering actuator so that the vehicle 100 travels through the target points of the unit times Δt.

Separately from this control, the controller 40 performs control to increase idle speed of the engine 1 in accordance with temperature and the like of the engine 1. For example, in low engine temperature condition, such as immediately after starting of the engine 1 from cold state, engine speed is set higher than normal (post-warmup) idle speed in order to maintain engine rotation and/or warm the engine 1. Moreover, an input shaft of an oil pump is connected to the output shaft of the engine 1, and when discharge oil temperature (oil temperature) is high, the oil pump is required to increase oil discharge. When oil temperature is high, therefore, idle speed of the engine 1 is set higher than when oil temperature is normal.

Figure 5:
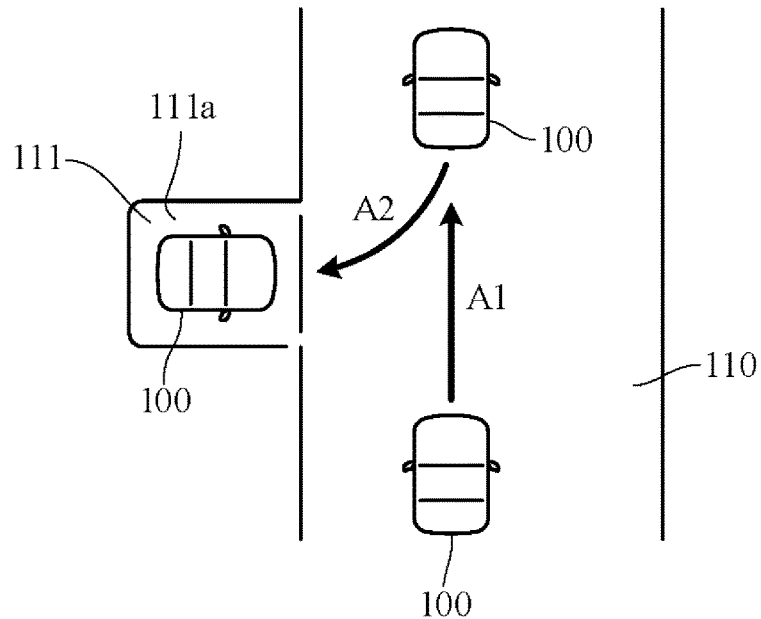
FIG. 5 is a plan view showing an example of traveling behavior of the vehicle by the autonomous parking apparatus according to the embodiment of the invention.

The above vehicle control system 101 includes a configuration for automatically parking the vehicle 100 in parking space set as a destination, i.e., a control configuration of the autonomous parking apparatus according to the present embodiment. FIG. 5 is a plan view showing an example of traveling behavior of the vehicle 100 by the autonomous parking apparatus according to the present embodiment. FIG. 5 shows an example in which the vehicle 100, initially running on a road 110, parks perpendicular to the road lane in an off-road parking space 111 facing the road 110 by parking in self-drive mode. This example shows how the vehicle 100 moves into the parking space 111 (target parking space) by autonomous driving.

The vehicle 100 once moves along the road 110 to beyond the parking space 111 as indicated by arrow A1, and after recognizing position of the parking space 111 based on positon data from a GPS unit 34 and picture signals from a camera attached to the vehicle 100, the vehicle 100 starts to travel in self-drive mode. In self-drive mode, the vehicle 100 moves into the parking space 111 by backward travel, as indicated by arrow A2. Optionally, the vehicle 100 can, for example, turn back sharply in self-drive mode after once traveling forward and reversing again. Alternatively, the vehicle 100 can enter the parking space front-end first rather than rear-end first.

In this regard, when the vehicle 100 parks from a flat paved road, for example, required driving force is low. In such a case, therefore, the vehicle 100 self-parks at low speed while frequently using driving force output when engine speed is idle speed, i.e., using creep torque at accelerator opening angle of zero. Required driving force during self-parking varies depending on road condition and gradient, number of passengers, and other factors. The required driving force is calculated by the action plan generation unit 45, for example.

Creep torque Tc is generally calculated by the following Equation (1) using engine speed Ne, pump capacity factor τ, torque ratio κ, and gear ratio i of the transmission 3:

$$Tc = Ne^2 \cdot \tau \cdot \kappa \cdot i \qquad \text{Eq. (I)}$$

As indicated by Eq. (I), creep torque Tc increases with increasing engine speed (idle speed) Ne. Since idle speed varies with engine temperature and the like as pointed out above, idle speed is high and creep torque Tc large at low engine temperature. Therefore, creep torque Tc exceeds required driving force during parking, and controllability and robustness are impaired during vehicle parking. In the present invention, therefore, optimum parking maneuvering of the vehicle 100 without loss of controllability or robustness, even under low and other temperature conditions, is ensured by configuring the autonomous parking apparatus as set out in the following.

Figure 6:
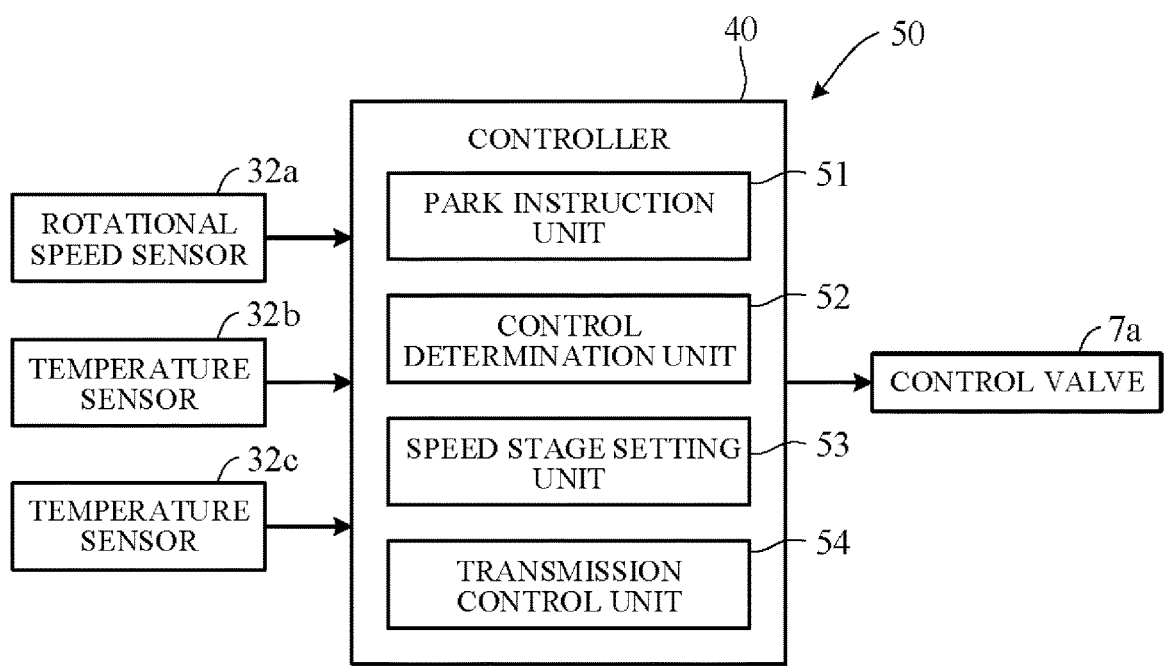
FIG. 6 is a block diagram illustrating main configuration of the autonomous parking apparatus according to the embodiment of the invention.

FIG. 6 is a block diagram showing a main configuration of an autonomous parking apparatus 50 according to the present embodiment. The autonomous parking apparatus 50 is a system for moving the vehicle 100 into the parking space 111 in self-parking mode and constitutes part of the vehicle control system 101 of FIG. 2. As shown in FIG. 6, the autonomous parking apparatus 50 includes the controller 40, a rotational speed sensor 32a, a temperature sensor 32b, a temperature sensor 32c and the control valve 7a, and the sensors 32a, 32b and 32c and the control valve 7a are connected to the controller 40.

The rotational speed sensor 32a detects speed (rotational speed) of the engine 1. The temperature sensor 32b detects temperature of the engine 1. For example, it detects engine temperature from temperature of lubricating oil of the engine 1, coolant flowing through a water jacket of the engine 1 or other temperature having correlation to temperature of the engine 1. The temperature sensor 32c detects temperature of transmission hydraulic oil discharged by an oil pump. The sensors 32a to 32c are members of the internal sensor group 32 of FIG. 4.

As functional constituents, the controller 40 includes a park instruction unit 51, a control determination unit 52, a speed stage setting unit 53, and a transmission control unit 54. The park instruction unit 51, control determination unit 52 and speed stage setting unit 53 are incorporated, for example, as part of the action plan generation unit 45 of FIG. 4, and the transmission control unit 54 is incorporated as part of the driving control unit 46 of FIG. 4.

The park instruction unit 51 instructs start of vehicle traveling in a self-parking mode such as automatically parks the vehicle 100 in a target parking position. This instruction is output when the vehicle 100 (its controller 40) recognizes the target parking position based on, for example, position data of the vehicle 100 measured by the GPS unit 34 and picture signals of cameras (of external sensor group 31) that take images of vehicle 100 surroundings.

After start of vehicle traveling in self-parking mode is instructed by the park instruction unit 51, the control determination unit 52 determines whether to perform control for reducing creep torque acting on the axels 4 (creep torque reduction control). This determination is, for example, determination of whether creep torque (creep force) is greater than required driving force, and performance of creep torque reduction control is determined to be necessary when creep torque is greater than required driving force. In actual practice, performance of creep torque reduction control is determined to be necessary when engine speed Ne detected by the rotational speed sensor 32a is equal to or greater than predetermined value Ne1, when engine temperature Te detected by the temperature sensor 32b is equal to or less than predetermined value Te1, and when oil temperature To detected by the temperature sensor 32c is equal to or greater than predetermined value To1.

Although predetermined values Ne1, Te1 and To1 can be fixed values, they can instead be values that vary with required driving force. Namely, in view of no need to set creep torque lower when required driving force is large, it is possible, for example, to set predetermined value Ne1 greater, predetermined value Te1 lower and predetermined value To1 higher in proportion as required driving force is greater. Predetermined value Te1 and predetermined value To1 are in a relationship of, for example, Te1<To1.

Figure 7:
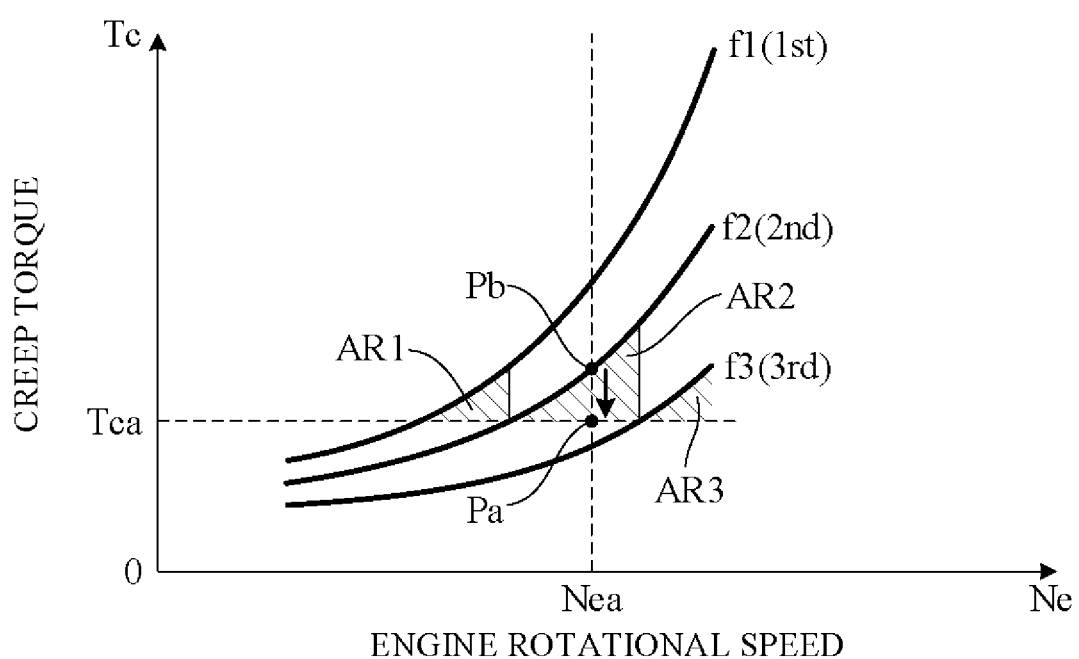
FIG. 7 is a diagram showing a relationship between engine speed and creep torque stored in a memory unit of FIG. 4 in advance.

The speed stage setting unit 53 responds to determination by the control determination unit 52 that performance of creep torque reduction control is necessary by setting target speed stage of the transmission 3 suitable for creep torque reduction control. FIG. 7 is a diagram showing relationship between engine speed Ne and creep torque Tc stored in the memory unit 42 (FIG. 4) in advance. Characteristic curves f1 to f3 in the drawing represent first speed stage, second speed stage and third speed stage characteristics, respectively. As seen from Eq. (I) above, creep torque Tc is proportional to the square of engine speed Ne and gear ratio i, so that, as shown in FIG. 7, creep torque Tc increases with increasing engine speed Ne and grows larger toward low speed stage side.

During forward vehicle traveling, the speed stage setting unit 53 ascertains operating point dictated by engine speed Ne detected by the rotational speed sensor 32a and required driving force (required creep torque Tc), and sets target speed stage to most high-side (smallest speed ratio) speed stage capable of satisfying this operating point. In other words, it calculates target speed stage. In FIG. 7, for example, the speed stages that satisfy operating point Pa at engine speed Nea and required creep torque Tca are first speed stage and second speed stage, and of these, the higher side second speed stage is set as target speed stage. Speed stage is fixed during reverse traveling. During reverse traveling of the vehicle, the speed stage setting unit 53 sets target speed stage to the fixed speed stage irrespective of engine speed.

The speed stage setting unit 53 additionally calculates engaging force required by the paired sets of frictional engagement elements of each clutch mechanism C1 to C3 concerned and each brake mechanism B1 to B3 concerned, i.e., engaging force required to satisfy operating point Pa. When target speed stage is second speed stage, for example, since the engaging mechanisms to be engaged according to the engagement table of FIG. 3 are the clutch mechanism C2 and the brake mechanisms B1 and B2, the speed stage setting unit 53 calculates required engaging forces of the engaging mechanisms C2, B1 and B2 at this time. When engaging force is large, the paired frictional engagement element sets of the associated engaging mechanism assume an integrally rotating engaged state, and when engaging force is small, the paired frictional engagement element sets of the associated engaging mechanisms assume a half-clutch state in which slipping between the sets of elements occurs. Controlling the engaging mechanisms to half-clutch state (called "slip control") makes it possible, for example, to reduce second speed stage operating point Pb at engine speed Nea in FIG. 7 to Pa, i.e., to lower operating point Pb to Pa when all of engaging mechanisms C2, B1 and B2 are in engaged state. In other words, slip control can reduce creep torque Tc by increasing speed ratio of the torque converter 2 and thereby lowering pump capacity factor τ and torque ratio κ of the above Eq. (I). Hatched regions AR1 to AR3 in FIG. 7 are regions of half-clutch state of the engaging mechanism for lowering creep torque to required creep torque Tca. Region AR1 is a region of half-clutch state of the engaging mechanism in first speed stage, region AR2 is a region of half-clutch state of the engaging mechanism in second speed stage, and region AR3 is a region of half-clutch state of the engaging mechanism in third speed stage.

In order to obtain required creep torque Tca in target speed stage, the speed stage setting unit 53 calculates required engaging force in accordance with difference between creep torque (on characteristic curves f1 to f3) when the engaging mechanism is in engaged state and required creep torque Tca (e.g. difference between operating points Pa and Pb). For example, it calculates required engaging force to be smaller in proportion as the difference is larger.

When multiple engaging mechanisms are necessary for implementing target speed stage, required creep torque Tca can be achieved by half-clutching any of them. In second speed stage, for example, required creep torque Tca can be obtained by controlling any among the clutch mechanism C2 and brake mechanisms B1 and B2 (e.g., clutch mechanism C2) to half-clutch state and controlling the others (e.g., brake mechanisms B1 and B2) to engaged state. The speed stage setting unit 53 can therefore be adapted to calculate engaging force required for establishing half-clutch state and engaging force required for establishing engaged state by individual target speed stage.

The transmission control unit 54 outputs a control signal to the control valve 7a to control engaging actions of the brake mechanisms B1 to B3 and the clutch mechanisms C1 to C3 so as to switch speed stage to target speed stage set by the speed stage setting unit 53. By outputting control signals at this time, the transmission control unit 54 adjusts hydraulic force acting on the pistons of the engaging mechanisms so as to control engaging force of the paired sets of frictional engagement elements of each mechanism to the required engaging force calculated by the speed stage setting unit 53. The transmission control unit 54 additionally controls the two-way clutch TWC by outputting a control signal to the electromagnetic actuator in accordance with target speed stage.

Figure 8:
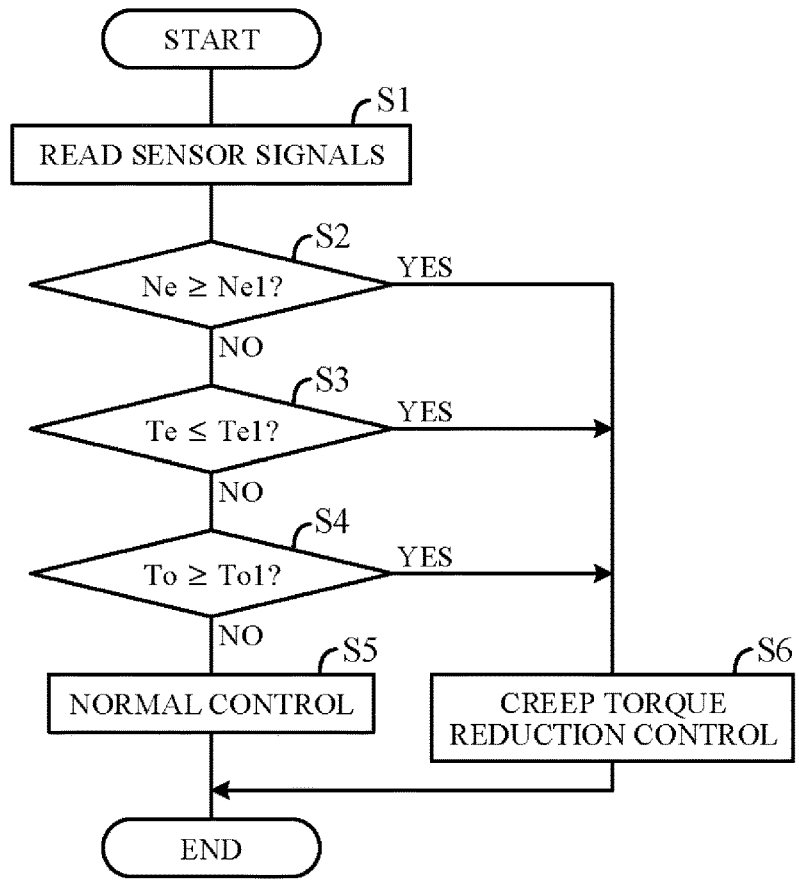
FIG. 8 is a flowchart showing an example of processing performed by a controller of FIG. 6.

FIG. 8 is a flowchart showing an example of processing, particularly processing related to control of the transmission 3, performed by the controller 40 of FIG. 6 (its CPU) in accordance with a program stored in memory in advance. The processing shown in this flowchart is started, for example, when self-parking mode is instructed. Namely, once the parking space 111 (FIG. 5) has been set as self-drive destination, the processing is started when the target parking position is recognized based on, inter alia, signals from camera(s) attached to the vehicle and periodically repeated insofar as self-parking is continued.

First, in S1 (S: processing Step), signals are read from the rotational speed sensor 32a and temperature sensors 32b and 32c. Next, in S2, whether engine speed Ne detected by the rotational speed sensor 32a is equal to or greater than predetermined value Ne1 is determined. If a negative decision is made in S2, the routine proceeds to S3, in which whether engine temperature Te detected by the temperature sensor 32b is equal to or less than predetermined value Te1 is determined. If a negative decision is made in S3, the routine proceeds to S4, in which whether oil temperature To detected by the temperature sensor 32c is equal to or greater than predetermined value To1 is determined.

If a negative decision is made in S4, the routine proceeds to S5, in which the transmission 3 is normally controlled. Under normal control, control signals are output to the control valve 7a instructing it to control engaging actions of the engaging mechanisms (clutch mechanisms C1 to C3 and brake mechanisms B1 to B3) so as to switch the transmission 3 to a predetermined stage (e.g., first stage) during forward travel of the vehicle 100 and to reverse stage during backward travel. In these cases, none of the engaging mechanisms is half-clutched and predetermined engaging mechanisms are controlled to engaged state in accordance with the table of FIG. 3. Engaging force applied to the paired sets of frictional engagement elements of each mechanism to be engaged at this time is controlled to first engaging force F1. Additionally in S5, a control signal is output to the electromagnetic actuator to control the two-way clutch TWC to locked state or unlocked state in accordance with the table of FIG. 3.

On the other hand, if a positive decision is made in any of S2, S3 and S4, the routine proceeds to S6, in which the transmission 3 is subjected to creep torque reduction control. The creep torque reduction control begins with determining whether the vehicle 100 is to travel forward or to travel in reverse. In case of forward traveling, operating point dictated by engine speed Ne detected by the rotational speed sensor 32a and required driving force calculated by the action plan generation unit 45 (required creep force Tc) is determined, and most high-side target speed stage capable of satisfying this operating point is set based on characteristic curves f1 to f3 of FIG. 7.

In addition, required engaging force of each engaging mechanism associated with the target speed stage is calculated in accordance with degree of divergence between the operating point and characteristic curve (among f1 to f3) of the target speed stage. And a control signal is output to the control valve 7a to engage the engaging mechanisms associated with the target speed stage so as to control speed stage to target speed stage. In the course of this control, engaging force of the paired sets of frictional engagement elements of each mechanism is controlled to the calculated required engaging force, and when the operating point and the associated target speed stage characteristic curve (among f1 to f3) are divergent, any one or all of the associated engaging mechanisms are half-clutched (slip controlled). Engaging force applied to the paired sets of frictional engagement elements of each mechanism to be half-clutched is controlled to second engaging force F2 smaller than first engaging force F1. Actual driving force equivalent to required driving force can therefore be obtained during forward traveling in self-parking mode.

During reverse traveling, reverse stage is selected as target speed stage, operating point dictated by engine speed Ne and required driving force is determined, and, similarly to in forward traveling, required engaging force of each engaging mechanism associated with reverse stage is calculated in accordance with degree of divergence between the operating point and reverse stage characteristics (not shown). And a control signal is output to the control valve 7a to engage the engaging mechanisms associated with the reverse stage so as to control speed stage to reverse stage. In the course of this control, engaging force of the paired sets of frictional engagement elements of each mechanism is controlled to the calculated required engaging force, and when the operating point and the reverse stage characteristics are divergent, any one or all of the associated engaging mechanisms are half-clutched (slip controlled). Actual driving force equivalent to required driving force can therefore be obtained during reverse traveling in self-parking mode. In S6, similarly to in S5, a control signal is output to the electromagnetic actuator to control the two-way clutch TWC to locked state or unlocked state.

A detailed explanation of operation of the autonomous parking apparatus 50 according the present embodiment follows. In self-parking mode, speed ratio shifting of the transmission 3 is normally controlled when engine speed Ne is lower than predetermined value Ne1, engine temperature Te is higher than predetermined value Te1, and oil temperature To is lower than predetermined value To1 (S5), for example, after warming up the engine 1. Under this control, the transmission 3 is switched to first speed, for example, during forward travel and to reverse stage during backward travel. Since creep torque is low in these situations, required driving force and creep torque are equal or nearly equal, so that the vehicle 100 can be easily controlled to perform parking maneuvers utilizing creep torque.

In contrast, speed ratio shifting of the transmission 3 is creep torque reduction controlled when engine speed Ne is predetermined value Ne1 or higher, engine temperature Te is predetermined value Te1 or lower, or oil temperature To is predetermined value To1 or higher (S6), for example, when self-parking under low-temperature environment. During forward travel under this control, the transmission 3 is switched to second speed, for example, and among the brake mechanisms B1 and B2 and the clutch mechanism C2 engaged in second speed as indicated in the table of FIG. 3, the clutch mechanism C2, for example, is controlled to half-clutch state.

Figure 9:
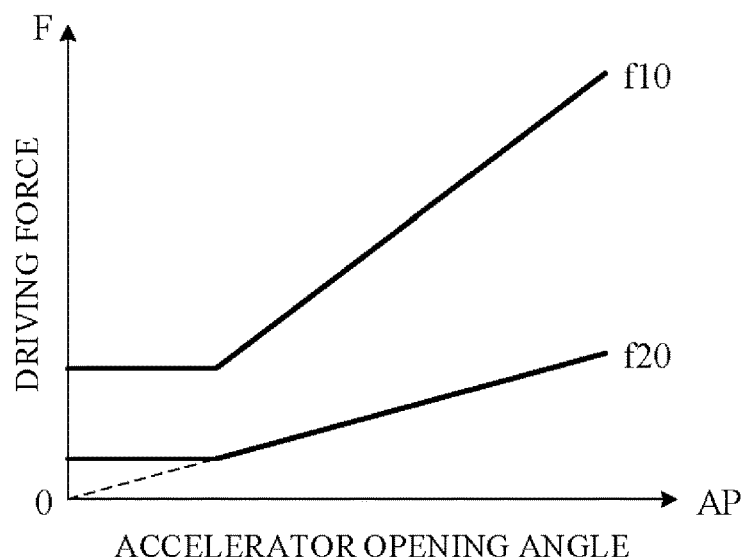
FIG. 9 is a diagram schematically illustrating an example of driving force characteristics by the autonomous parking apparatus according to the embodiment of the invention.

FIG. 9 is a diagram schematically illustrating an example of driving force characteristics representing relationship between accelerator opening angle AP (exactly speaking, simulated accelerator opening angle during self-driving) and driving force F. Characteristic curve f10 represents driving force characteristics of first speed stage under low-temperature environment, for example, and characteristic curve f20 represents driving force characteristics obtained by creep torque reduction control. Characteristic curve f20 represents driving force characteristics farther toward high gear side (second speed) than the characteristic curve f10, so that rate of driving force F increase with increasing accelerator opening angle AP (curve slope) is smaller than that of characteristic curve f10. Since this enables finer adjustment of driving force F in response to accelerator opening angle AP, it enhances controllability. Moreover, creep torque at accelerator opening angle AP of zero is low in characteristic curve f20 (dotted line) because the clutch mechanism C2 is controlled to half-clutch state. As a result, the vehicle 100 can be easily controlled to perform parking travel utilizing creep torque even under a low-temperature environment or similar. In other words, when required driving force is lower than creep torque of characteristic curve f10, driving force F corresponding to such required drive force can be easily obtained. Moreover, degree of half-clutching can be varied by adjusting engaging force of the clutch mechanism C2, so that, as indicated by the dotted line in FIG. 9 for example, driving force F can also be controlled to 0 when accelerator opening angle is 0.

In creep torque reduction control during backward travel, the transmission 3 is switched to reverse stage and, as shown in FIG. 3, one or the other of the brake mechanism B2 and clutch mechanism C3 engaged in reverse stage, e.g., the clutch mechanism C3, is controlled to half-clutch state. Driving force characteristics can therefore be shifted to low driving force side, similarly to those of characteristic curve f20 of FIG. 9, whereby parking travel can be easily performed utilizing creep torque.

The present embodiment can achieve advantages and effects such as the following:

(1) The autonomous parking apparatus 50 according to the present embodiment includes: the engine 1; the torque converter 2 input with torque output from the engine 1; the transmission 3 provided in the torque transmission path between the torque converter 2 and the axels 4 for changing speed ratio of rotation input through the input shaft 3a; the park instruction unit 51 for instructing self-parking of the vehicle 100 at the target parking position; the sensors 32a to 32c for respectively detecting engine speed Ne, engine temperature Te and oil temperature To as physical quantities correlated to creep torque Tc acting on the axels 4; the control determination unit 52 responsive to self-parking instruction by the park instruction unit 51 for determining need for creep torque reduction control based on detection values of the sensors 32a to 32c; and the transmission control unit 54 for controlling the transmission 3 in accordance with determination result of the control determination unit 52 (FIGS. 1 and 6). The transmission 3 includes engaging mechanisms (clutch mechanisms C1 to C3 and brake mechanisms B1 to B3) having paired sets of frictional engagement elements that engage and disengage with each other and is adapted to transmit and output torque input through the input shaft 3a through the engaging mechanisms (FIG. 2). The transmission control unit 54 is responsive to determination by the control determination unit 52 that creep torque reduction control is unnecessary, for controlling engaging force of the paired sets of frictional engagement elements to first engaging force F1, at which the paired sets of frictional engagement elements rotate integrally, and controlling speed stage of the transmission 3 to predetermined speed stage (e.g., first speed), and is responsive to determination by the control determination unit 52 that creep torque reduction control is necessary for controlling (slip controlling) engaging force of the paired sets of frictional engagement elements to second engaging force F2 smaller than first engaging force F2, or controlling (upshifting) speed stage of the transmission 3 to a speed stage (e.g., second speed) whose speed ratio is smaller than speed ratio of the predetermined speed stage when it is determined that creep torque reduction control is unnecessary. Alternatively, the transmission control unit 54 performs slip controlling and upshifting simultaneously.

Thus when creep torque reduction control is determined necessary, it is possible by performing at least one of transmission 3 upshifting and slip control to reduce creep torque of the vehicle 100 having the torque converter 2 and also to minimize creep torque variance with temperature environment and the like. Since controllability and robustness in self-parking mode therefore improve, the vehicle 100 can be easily controlled to perform parking maneuvers with driving force equivalent to required driving force. Although slip control is hard to implement in manual driving mode that prioritizes responsiveness to accelerator pedal operation, half-clutching of the engaging mechanisms of the transmission 3 by slip control causes no problem self-driving mode (self-parking mode).

(2) When the rotational speed sensor 32a detects engine speed Ne of or greater than predetermined value Ne1 at time of self-parking being instructed by the park instruction unit 51, the control determination unit 52 determines that creep torque reduction control is necessary (FIG. 8). The reason for this is that although creep torque Tc becomes greater than required driving force during self-parking when engine speed Ne reaches or exceeds predetermined value Ne1, because creep torque Tc is proportional to the square of engine speed Ne as indicated by the above Eq. (I), controllability in self-parking mode can nevertheless be improved owing to the implementation of creep torque reduction control in such a case.

(3) When the temperature sensor 32b detects engine temperature Te of or below predetermined value Te1 at time of self-parking being instructed by the park instruction unit 51, the control determination unit 52 determines that creep torque reduction control is necessary (FIG. 8). This minimizes increase in creep torque Tc despite idle speed of the engine 1 being high at low temperature and, as such, enables stable travel control in self-parking mode.

(4) When the temperature sensor 32c detects oil temperature of or above predetermined value To1 at time of self-parking being instructed by the park instruction unit 51, the control determination unit 52 determines that creep torque reduction control is necessary (FIG. 8). This minimizes increase in creep torque and enables good self-parking performance in a case where engine speed Ne is increased in order to ensure adequate oil pump discharge at high oil temperature.

Various modifications of the aforesaid embodiment are possible. Some examples are explained in the following. The aforesaid embodiment (FIG. 2) utilizes a stepped transmission with ten forward speeds and one reverse speed having the clutch mechanisms C1 to C3, the brake mechanisms B1 to B3, and the two-way clutch TWC. However, the transmission, specifically the number, arrangement and the like of its speed stages and engaging mechanisms, are not limited to this configuration. Although the embodiment adopts engaging mechanisms having paired sets of frictional engagement elements, an engaging mechanism is not limited to this configuration. Alternatively, the engaging mechanism can be ones having dog clutches instead of friction clutches.

Although in the aforesaid embodiment, the autonomous parking apparatus 50 is applied to the self-driving vehicle 100, it can also be applied to a vehicle that autonomously performs only self-parking. For example, it can be applied to automatically perform parking maneuvers to a predetermined parking position after the vehicle is manually driven to in front of the parking space. Optionally in such a case, the vehicle can be equipped with a switch (self-park instruction switch) for enabling self-park capability that can be operated by the driver to start park maneuvering in self-drive mode. Therefore, a configuration of a park instruction unit is not limited to the aforesaid configuration. Namely, the present invention can be similarly applied to other types of vehicles, such as ones having a parking assist apparatus and ones having only partial self-drive capability.

In the aforesaid embodiment (FIG. 6), the rotational speed sensor 32a serving as a rotational speed detector detects rotational speed Ne of the engine 1 (internal combustion engine), the temperature sensor 32b serving as a temperature detector detects engine temperature Te, and the temperature sensor 32c serving as a temperature detector detects oil temperature To of hydraulic oil. In other words, physical quantities having a correlation with creep torque acting on the axels are detected. However, a detector is not limited to the aforesaid configuration and can be adapted to detect creep torque by another method. Therefore, the control determination unit 52 is not limited to this configuration, namely, a determination unit for determining whether it is necessary to perform a creep torque reduction control is not limited to the aforesaid configuration.

In the aforesaid embodiment, as creep torque reduction control during forward travel, the transmission control unit 54 performs upshift of the transmission 3 and controls (slip controls) the engaging mechanisms to half-clutch state. However, creep torque reduction control during forward travel can instead be performed by implementing one or the other of upshifting and slip control even under a condition when both can be implemented. In other words, a transmission control unit can be of any configuration insofar as adapted to perform at least one of a first creep torque reduction control for controlling engaging force of a pair of engagement elements to second engaging force F2 smaller than first engaging force F1 and a second creep torque reduction control for controlling speed stage of the transmission to a second speed stage (e.g., second speed or third speed) of smaller speed ratio than a first speed stage (e.g., first speed) during normal control. In the aforesaid embodiment, the speed stage setting unit 53 is adapted to calculate target speed stage of the transmission 3 suitable for creep torque reduction control and to calculate required engaging force of the engaging mechanisms C1 to C3 and B1 to B3, but a calculation unit can be of any configuration.

The present invention can also be used as an autonomous parking method configured to control engaging force of a pair of engagement elements or speed stage of a transmission in accordance with whether a creep torque reduction control is necessary.

The above embodiment can be combined as desired with one or more of the above modifications. The modifications can also be combined with one another.

According to the present invention, it is possible to minimize creep torque variance with temperature environment and improve a controllability in self-parking.

Above, while the present invention has been described with reference to the preferred embodiments thereof, it will be understood, by those skilled in the art, that various changes and modifications may be made thereto without departing from the scope of the appended claims.

What is claimed is:

1. An autonomous parking apparatus incorporated into a vehicle, comprising:
an internal combustion engine;
a torque converter to which a torque output from the internal combustion engine is input;
an axle;
a transmission having a plurality of speed stages, provided in a torque transmission path between the torque converter and the axle and including an input shaft connected to the torque converter and an output shaft connected to the axle;
a detector configured to detect a creep torque acting on the axle or a physical quantity having a correlation with the creep torque; and
an electronic control unit having a microprocessor and a memory, wherein
the transmission includes an engaging mechanism having a pair of engagement elements engaging or disengaging with each other, and is configured to transmit a torque input from the input shaft through the engaging mechanism to the output shaft,
the microprocessor is configured to perform:
instructing a self-parking of the vehicle;
determining whether it is necessary to perform a creep torque reduction control based on the creep torque or the physical quantity detected by the detector when the self-parking is instructed; and
controlling the transmission in accordance with a determination result in the determining,
the detector includes a rotational speed detector configured to detect a rotational speed of the internal combustion engine; and
the microprocessor is further configured to perform:
calculating a target speed stage of the transmission and a required engaging force of the pair of engagement elements so that an actual driving force in accordance with a rotational speed of the internal combustion engine is equal to a required driving force;
the calculating including calculating a speed stage having the smallest speed ratio among the speed stages capable of generating the required driving force at the rotational speed detected by the rotational speed detector as the target speed stage, based on characteristics of the creep torque for the rotational speed of the internal combustion engine corresponding to each of the plurality of speed stages of the transmission; and
the controlling including controlling the speed stage of the transmission to the target speed stage calculated in the calculating and controlling the engaging force of the pair of engagement elements to the required engaging force calculated in the calculating, when it is determined in the determining that it is necessary to perform the creep torque reduction control.

2. The apparatus according to claim 1, wherein
the microprocessor is configured to perform
the determining including determining that it is necessary to perform the creep torque reduction control when the rotational speed detected by the rotational speed detector is equal to or greater than a predetermined rotational speed in a state that the self-parking is instructed.

3. The apparatus according to claim 1, wherein
the microprocessor is configured to perform
the controlling including controlling the speed stage of the transmission to a reverse stage and controlling the engaging force of the pair of engagement elements to the required engaging force calculated in the calculating during a backward travel of the vehicle, and controlling the speed stage of the transmission to the target speed stage calculated in the calculating and controlling the engaging force of the pair of engagement elements to the required engaging force calculated in the calculating during a forward travel of the vehicle, when it is determined in the determining that it is necessary to perform the creep torque reduction control.

4. The apparatus according to claim 1, wherein
the engaging mechanism includes a plurality of the pair of engagement elements, and
the microprocessor is configured to perform:
calculating the required engagement force of the pair of engagement elements corresponding to the target speed among the plurality of the pair of engagement elements; and
the calculating including calculating the required engagement force of the pair of engagement elements corresponding to the target speed stage according to a degree of deviation between the required driving force and the creep torque of the target speed stage corresponding to the rotational speed detected by the rotational speed detector, wherein
the degree of deviation is obtained based on the characteristics of the creep torque of the target speed stage relative to the rotational speed of the internal combustion engine.

5. An autonomous parking apparatus incorporated into a vehicle, comprising:
an internal combustion engine;
a torque converter to which a torque output from the internal combustion engine is input;
an axle;
a transmission having a plurality of speed stages, provided in a torque transmission path between the torque converter and the axle and including an input shaft connected to the torque converter and an output shaft connected to the axle;
a detector configured to detect a creep torque acting on the axle or a physical quantity having a correlation with the creep torque; and
an electronic control unit having a microprocessor and a memory, wherein
the transmission includes an engaging mechanism having a pair of engagement elements engaging or disengaging with each other, and is configured to transmit a torque input from the input shaft through the engaging mechanism to the output shaft,
the microprocessor is configured to function as:
a park instruction unit configured to instruct a self-parking of the vehicle;
a determination unit configured to determine whether it is necessary to perform a creep torque reduction control based on the creep torque or the physical quantity detected by the detector when the self-parking is instructed by the park instruction unit; and a transmission control unit configured to control the transmission in accordance with a determination result by the determination unit, the detector includes a rotational speed detector configured to detect a rotational speed of the internal combustion engine; and the microprocessor is configured to further function as a calculation unit configured to calculate a target speed stage of the transmission and a required engaging force of the pair of engagement elements so that an actual driving force in accordance with a rotational speed of the internal combustion engine is equal to a required driving force, wherein the calculation unit is configured to calculate a speed stage having the smallest speed ratio among the speed stages capable of generating the required driving force at the rotational speed detected by the rotational speed detecting unit as the target speed stage, based on characteristics of the creep torque for the rotational speed of the internal combustion engine corresponding to each of the plurality of speed stages of the transmission, and the transmission control unit is configured to control the speed stage of the transmission to the target speed stage calculated in the calculating and controlling the engaging force of the pair of engagement elements to the required engaging force calculated in the calculating, when it is determined in the determining that it is necessary to perform the creep torque reduction control.

6. The apparatus according to claim 5, wherein
the determination unit is configured to determine that it is necessary to perform the creep torque reduction control when the rotational speed detected by the rotational speed detector is equal to or greater than a predetermined rotational speed in a state that the self-parking is instructed by the park instruction unit.

7. The apparatus according to claim 5, wherein
the transmission control unit is configured to control the speed stage of the transmission to a reverse stage and control the engaging force of the pair of engagement elements to the required engaging force calculated by the calculation unit during a backward travel of the vehicle, and to control the speed stage of the transmission to the target speed stage calculated by the calculation unit and control the engaging force of the pair of engagement elements to the required engaging force calculated by the calculation unit during a forward travel of the vehicle, when it is determined by the determination unit that it is necessary to perform the creep torque reduction control.

8. The apparatus according to claim 4, wherein
the microprocessor is configured to perform
the calculating including calculating the required engagement force of the pair of engagement elements controlled by a first engagement force of the pair of engagement elements corresponding to the target speed stage and the required engagement force of the pair of engagement elements controlled by a second engagement force of the pair of engagement elements corresponding to the target speed stage in accordance with the degree of deviation.

9. An autonomous parking method for autonomously parking a vehicle at a target parking position, the vehicle including an internal combustion engine, a torque converter to which a torque output from the internal combustion engine is input, an axle, and a transmission having a plurality of speed stages, provided in a torque transmission path between the torque converter and the axle and including an input shaft connected to the torque converter and an output shaft connected to the axle, the transmission including an engaging mechanism having a pair of engagement elements engaging or disengaging with each other, and is configured to transmit a torque input from the input shaft through the engaging mechanism to the output shaft, the method comprising:
detecting a creep torque acting on the axle or a physical quantity having a correlation with the creep torque;
instructing a self-parking of the vehicle;
determining whether it is necessary to perform a creep torque reduction control based on the creep torque or the physical quantity detected in the detecting when the self-parking is instructed; and
controlling the transmission in accordance with a determination result in the determining, wherein
the detector includes a rotational speed detector configured to detect a rotational speed of the internal combustion engine,
the method further comprises calculating a target speed stage of the transmission and a required engaging force of the pair of engagement elements so that an actual driving force in accordance with a rotational speed of the internal combustion engine is equal to a required driving force,
the calculating includes calculating a speed stage having the smallest speed ratio among the speed stages capable of generating the required driving force at the rotational speed detected by the rotational speed detector as the target speed stage, based on characteristics of the creep torque for the rotational speed of the internal combustion engine corresponding to each of the plurality of speed stages of the transmission, and
the controlling includes controlling the speed stage of the transmission to the target speed stage calculated in the calculating and controlling the engaging force of the pair of engagement elements to the required engaging force calculated in the calculating, when it is determined in the determining that it is necessary to perform the creep torque reduction control.

10. The method according to claim 9, wherein
the determining includes determining that it is necessary to perform the creep torque reduction control when the rotational speed detected in the detecting is equal to or greater than a predetermined rotational speed in a state that the self-parking is instructed.

11. The method according to claim 9, wherein
the controlling includes controlling the speed stage of the transmission to a reverse stage and controlling the engaging force of the pair of engagement elements to the required engaging force calculated in the calculating during a backward travel of the vehicle, and controlling the speed stage of the transmission to the target speed stage calculated in the calculating and controlling the engaging force of the pair of engagement elements to the required engaging force calculated in the calculating during a forward travel of the vehicle, when it is determined in the determining that it is necessary to perform the creep torque reduction control.

12. The method according to claim 9, wherein
the engaging mechanism includes a plurality of the pair of engagement elements,
the method further comprises calculating the required engagement force of the pair of engagement elements corresponding to the target speed among the plurality of the pair of engagement elements, the calculating includes calculating the required engagement force of the pair of engagement elements corresponding to the target speed stage according to a degree of deviation between the required driving force and the creep torque of the target speed stage corresponding to the rotational speed detected by the rotational speed detector, and the degree of deviation is obtained based on the characteristics of the creep torque of the target speed stage relative to the rotational speed of the internal combustion engine.

13. The method according to claim 12, wherein the calculating includes calculating the required engagement force of the pair of engagement elements controlled by a first engagement force of the pair of engagement elements corresponding to the target speed stage and the required engagement force of the pair of engagement elements controlled by a second engagement force of the pair of engagement elements corresponding to the target speed stage in accordance with the degree of deviation.

* * * * *